(12) United States Patent
Kim et al.

(10) Patent No.: US 7,787,211 B2
(45) Date of Patent: Aug. 31, 2010

(54) BACK ELECTROMOTIVE FORCE (BEMF) CALIBRATION METHOD, METHOD OF CONTROLLING UNLOADING OF DISK DRIVE APPARATUS USING BEMF CALIBRATION METHOD, AND DISK DRIVE APPARATUS USING THE SAME

(75) Inventors: Kyoung-soo Kim, Suwon-si (KR); Seung-chul Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 193 days.

(21) Appl. No.: 11/832,159

(22) Filed: Aug. 1, 2007

(65) Prior Publication Data

US 2008/0030891 A1 Feb. 7, 2008

(30) Foreign Application Priority Data

Aug. 4, 2006 (KR) .................. 10-2006-0073776

(51) Int. Cl.
*G11B 5/596* (2006.01)
(52) U.S. Cl. .................................................. 360/78.06
(58) Field of Classification Search ............... None
See application file for complete search history.

(56) References Cited

U.S. PATENT DOCUMENTS 5,844,743 A * 12/1998 Funches ................. 360/78.04
6,690,536 B1    2/2004 Ryan
6,795,268 B1 *  9/2004 Ryan ........................ 360/78.04
6,826,007 B1 * 11/2004 Patton, III ................ 360/78.06
7,068,463 B1 *  6/2006 Ji et al. ..................... 360/78.04
2002/0054451 A1  5/2002 Moon et al.
2002/0149873 A1 10/2002 Schillaci et al.
2004/0257695 A1 12/2004 Tan et al.

FOREIGN PATENT DOCUMENTS

JP    2004-171737    6/2004

OTHER PUBLICATIONS

Korean Office Action dated Aug. 3, 2007 issued in KR 2006-73776.

* cited by examiner

*Primary Examiner*—K. Wong
(74) *Attorney, Agent, or Firm*—Stanzione & Kim, LLP

(57) ABSTRACT

A method of calibrating a parameter to measure the back electromotive force (BEMF) of a voice coil motor (VCM), and a method and apparatus to use the calibrating method to perform unloading control. The calibration method includes: reading servo data and measuring a BEMF value while seeking two predetermined points on a disk, and storing the servo data and the BEMF value, generating an actual velocity curve of a head using the stored servo data, and an estimated velocity curve of the head using the stored BEMF value and adjusting a parameter related to a BEMF measurement to align the actual velocity curve of the head with the estimated velocity curve of the head.

7 Claims, 6 Drawing Sheets

Position #1 → Position #2

- V_real
- V_bemf

Position #1 → Position #2

- V_real
- V_bemf

BACK ELECTROMOTIVE FORCE (BEMF) CALIBRATION METHOD, METHOD OF CONTROLLING UNLOADING OF DISK DRIVE APPARATUS USING BEMF CALIBRATION METHOD, AND DISK DRIVE APPARATUS USING THE SAME

CROSS-REFERENCE TO RELATED APPLICATIONS

This application claims priority under 35 U.S.C. §119(a) from Korean Patent Application No. 10-2006-0073776, filed on Aug. 4, 2006, in the Korean Intellectual Property Office, the disclosure of which is incorporated herein in its entirety by reference.

BACKGROUND OF THE INVENTION

1. Field of the Invention

The present general inventive concept relates to a method and apparatus to control a disk drive apparatus, and more particularly, to a method of calibrating parameters to measure the back electromotive force (BEMF) of a voice coil motor (VCM), and a method and apparatus to use the calibration method to perform unloading control.

2. Description of the Related Art

The present general inventive concept is related to inventions disclosed in U.S. Patent Publication Nos. 2002-054451 and 2002-149873, which are hereby incorporated herein by reference.

In U.S. Patent Publication No. 2002-054451, a method of measuring the BEMF of a voice coil motor in a disk drive, and a technology that uses this method to control the velocity of the VCM without a servo signal are disclosed. In U.S. Patent Publication No. 2002-149873, a technology that detects a value of a current flowing to a VCM to measure the BEMF thereof is disclosed.

In a disk drive, the velocity of a head must be precisely known in order to accurately control seeking and other operations. Conventionally, the velocity of the head is calculated using servo data written on the surface of the disk. The servo data includes track and sector numbers, which are used to calculate the velocity of the head.

However, these methods can be applied only when the head is able to read the servo data. For example, in ramp loading/unloading-type hard disk drives, the head is not disposed on the surface of the disk while the head is being loaded from the ramp to the disk or being unloaded from the disk to the ramp, so that the head cannot read servo data written on the surface of the disk. Therefore, the velocity of the head cannot be determined.

To solve this problem, in ramp loading/unloading-type hard disk drives, there is used a method of detecting the velocity of a head through the BEMF of the VCM driving the head slider, instead of using servo data.

Recently, in non-ramp loading/unloading-type hard disk drives, there has been adopted the same method of detecting the velocity of the head through the BEMF of the VCM, wherein the detected head velocity is fed back to control the velocity of the head in loading and unloading operations. Also, in a seek operation of the servo drive, the moving velocity of the head is detected through the BEMF of the VCM to control the moving velocity of the head in accelerating and decelerating regions.

However, when a current is applied to the voice coil motor (VCM) that moves the actuator of the disk drive, the temperature of the coil of the VCM rises. As the temperature of the coil rises, a change in the resistance value of the VCM occurs, thereby causing a change in the measured BEMF of the VCM by the amount of resistance value change. This applies especially to disk drives for mobile devices, which have thinner VCM coils, so that the change in resistance values of the coils through the current is comparatively larger. Therefore, the parameter values to measure the BEMF calibrated during loading cannot be used during unloading.

Likewise, a change in the resistance value of a VCM coil leads to errors in BEMF values, so that when the BEMF values are detected to control the head moving velocity, the head cannot be precisely controlled to move at a target velocity.

SUMMARY OF THE INVENTION

The present general inventive concept provides a method of calibrating a back electromotive force (BEMF) that performs a BEMF calibration process before controlling an unloading operation in a disk drive apparatus, applies parameters adjusted through the BEMF calibration, and then performs controlling of the disk drive apparatus unloading, a method of controlling unloading in a disk drive apparatus using the BEMF calibration method and a disk drive apparatus using the same. Also, the present general inventive concept provides a computer readable recording medium storing a program to perform the above methods on a computer.

Additional aspects and utilities of the present general inventive concept will be set forth in part in the description which follows and, in part, will be obvious from the description, or may be learned by practice of the general inventive concept.

The foregoing and/or other aspects and utilities of the present inventive concept may be achieved by providing a method of calibrating a back electromotive force (BEMF), including reading servo data and measuring a BEMF value while seeking two predetermined points on a disk, and storing the servo data and the BEMF value, generating an actual velocity curve of a head using the stored servo data, and an estimated velocity curve of the head using the stored BEMF value, and adjusting a parameter related to a BEMF measurement to align the actual velocity curve of the head with the estimated velocity curve of the head.

The generating of the actual velocity curve of the head may use a servo signal as a sampling interval to divide an obtained seek distance into seek time intervals, and may be generated from calculated actual velocity values of the head, and the estimated velocity of the head may be generated from an estimated velocity value of the head calculated by dividing a BEMF value measured in a voice coil motor (VCM) over a sampling interval by a BEMF constant to derive an estimated angular velocity value, and multiplying the estimated angular velocity value by a transforming proportional constant.

The parameter may correspond to a changing rate of a coil resistance value of the VCM, and may be varied to align the actual velocity curve of the head with the estimated velocity curve of the head.

The adjusting of the parameter may include calculating a ratio of the actual velocity curve of the head to the estimated velocity curve of the head, and adjusting the parameter related to the BEMF measurement to make the ratio approach 1.

The ratio of the actual velocity curve of the head to the estimated velocity curve of the head may be calculated as a ratio of a first harmonic sine coefficient of the actual velocity of the head to a first harmonic sine coefficient of the estimated velocity of the head.

The foregoing and/or other aspects and utilities of the present general inventive concept may also be achieved by providing a method of controlling an unloading operation of a disk drive apparatus, including, determining whether conditions to perform the unloading operation in the disk drive apparatus are present, seeking two predetermined points on a disk, and calculating an actual velocity curve of a head using servo data and an estimated velocity curve of the head using a BEMF, when it is determined in the determining operation that conditions to perform the unloading operation in the disk drive apparatus are present, adjusting a parameter related to a BEMF measurement to align the actual velocity curve of the head with the estimated velocity curve of the head, and applying the parameter adjusted in the adjusting operation (c), and using the measured BEMF to control an unloading velocity.

The foregoing and/or other aspects and utilities of the present general inventive concept may also be achieved by providing a disk drive apparatus including a disk to store data, a head to write or read data on or from the disk, an actuator to move the head, a drive unit to generate a motor driving current corresponding to a motor control signal, a VCM to move the actuator through a rotational force according to the motor driving current, a BEMF measurer to measure a BEMF generated by the VCM, and a controller to generate the motor control signal that controls a velocity of the VCM, to seek two predetermined points on the disk and respectively calculate an actual velocity curve of the head using servo data and an estimated velocity curve of the head through a BEMF, and to control a parameter related to a BEMF measurement to align the actual velocity curve of the head with the estimated velocity curve of the head.

The BEMF measurer may include a sensing resistance connected directly to a coil of the VCM to detect a current flowing to the coil, and an amplifier to amplify a voltage, increased at the sensing resistance, through a variable gain, wherein the BEMF generated by the VCM may be measured through a voltage value outputted from the amplifier.

The foregoing and/or other aspects and utilities of the present general inventive concept may also be achieved by providing a computer-readable recording medium having recorded thereon a program to perform a method of calibrating BEMF and a method of controlling an unloading operation of the disk drive apparatus using the calibration method.

The foregoing and/or other aspects and utilities of the present general inventive concept may also be achieved by providing a method of operating a disk drive apparatus having a voice coil motor (VCM), the method including reading servo data and measuring one or more back electromotive force (BEMF) values while seeking at least two predetermined points on a disk, generating actual velocity data based on the servo data, generating estimated velocity data of a head using the measured one or more BEMF values and adjusting a parameter related to the measured one or more BEMF values based on the generated actual velocity data and the estimated velocity data of the head.

The foregoing and/or other aspects and utilities of the present general inventive concept may also be achieved by providing a disk drive apparatus having a voice coil motor (VCM), the apparatus including a back electromotive force (BEMF) measuring unit to measure one or more BEMF values generated by the VCM and a controller to seek two predetermined points on a disk and respectively to calculate actual velocity data of the head based on servo data and estimated velocity data of the head based on the measured one or more BEMF values, and to control a parameter related to the measured one or more BEMF values to equate the actual velocity data of the head with the estimated velocity data of the head.

BRIEF DESCRIPTION OF THE DRAWINGS

These and/or other aspects and utilities of the present general inventive concept will become more apparent by describing in detail exemplary embodiments thereof with reference to the attached drawings in which.

DETAILED DESCRIPTION OF THE PREFERRED EMBODIMENTS

Figure 1A:
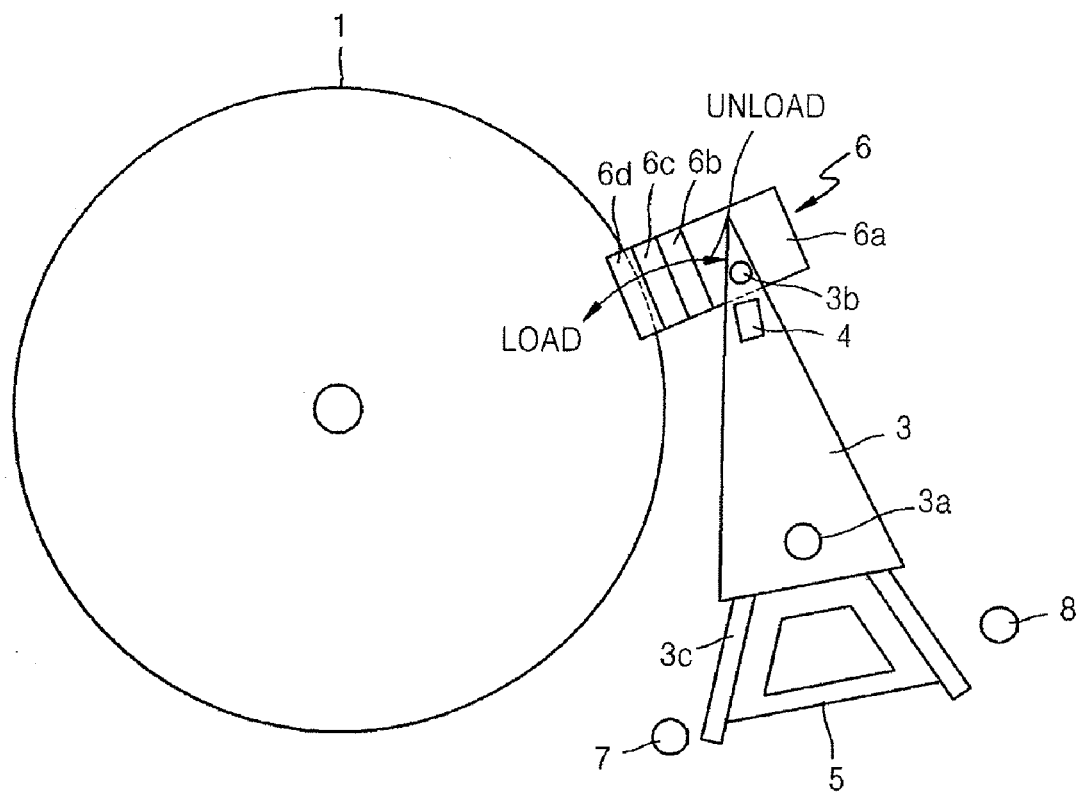
FIGS. 1A and 1B are a schematic plan view and a sectional view of a ramp loading-type disk drive apparatus illustrating a loading and unloading process of a head slider, according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 1B:
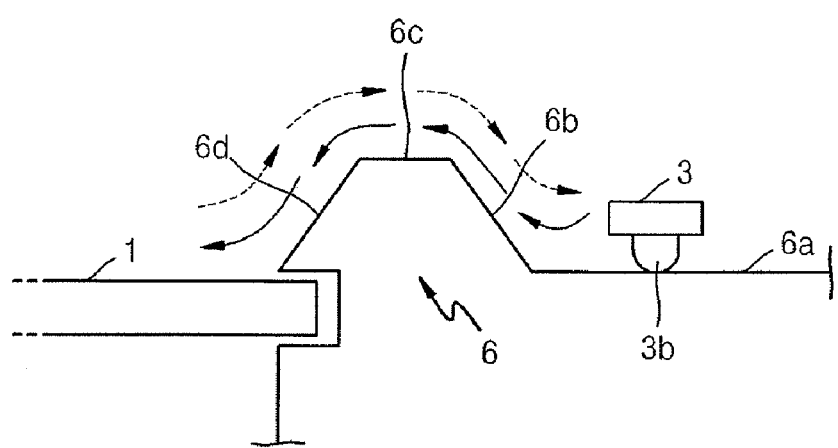

FIGS. 1A and 1B are a schematic plan view and a sectional view of a ramp loading-type disk drive apparatus illustrating a loading and unloading process of a head slider, according to an embodiment of the present general inventive concept. A ramp loading-type disk drive includes a ramp 6 and a protruding portion 3b formed on an actuator 3. When a driving current is applied to a voice coil motor (VCM) 5, the actuator 3 rotates about a drive axis 3a, and the protruding portion 3b slides along the ramp surfaces 6a through 6d.

Referring to FIG. 1A, a clockwise movement of the actuator 3 corresponds to an unloading direction, and a counterclockwise movement thereof corresponds to a loading direction. When the head slider 4 is unloaded, the protruding portion 3b formed on the actuator 3 contacts the packing surface 6d of the ramp 6. A coil supporting member 3c either contacts or comes close to an outer crash stop 7.

When the head slider 4 is loaded, the actuator rotates in the loading direction so that the slider 4 moves over a rotating disk 1. The protruding portion 3b slides over the surfaces of the ramp 6, sequentially moving over each surface 6a through 6c and dropping from the slanted packing surface 6d.

When the head slider 4 is unloaded, the actuator 3 rotates in the unloading direction so that the head slider 4 moves toward the packing surface 6d. The protruding portion 3b slides sequentially over the surfaces 6d through 6b of the ramp 6 to the packing surface 6a.

As illustrated in FIGS. 1A and 1B, the velocity of the head slider 4 must be controlled when the head slider 4 moves toward the disk 1 from the packing surface 6d of the ramp 6 during the loading of the head slider 4 from the ramp 6 to the disk 1, or when the head slider 4 is removed from the disk 1 during the unloading of the head slider 4 from the disk 1 to the ramp 6. For this control, the velocity of the head slider 4 is determined. The velocity of the head slider 4 is detected and controlled especially during unloading, in order to prevent the actuator 3 from crashing against the outer crash stop 7 and being subjected to shock, as well as to prevent collision noise from being generated.

However, as illustrated in FIG. 1A, when the head slider 4 is loaded from the ramp 6 to the disk 1 or unloaded from the disk 1 to the ramp 6, the head slider is not disposed above the surface of the disk 1. Therefore, the velocity of the head cannot be determined using the servo data written on the disk surface, so that the back electromotive force (BEMF) of the VCM 5 is used to determine the velocity of the head.

To accurately calculate the moving velocity of the head based on the BEMF, the present general inventive concept discloses a calibration process of the BEMF, which will be described below.

Figure 2:
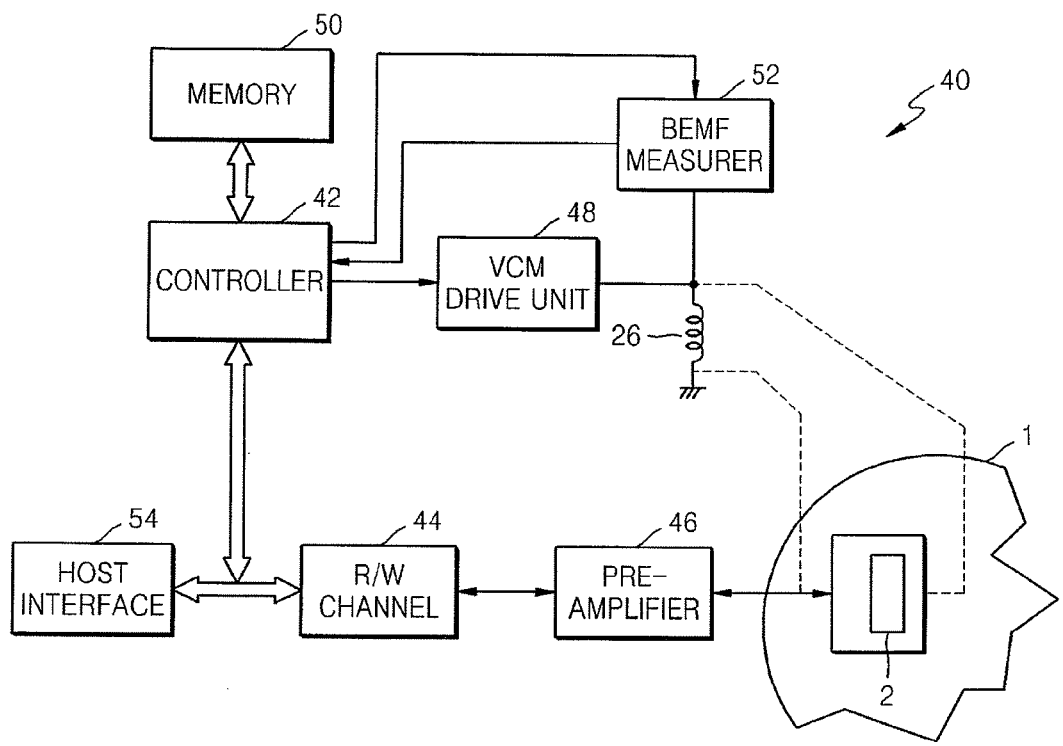
FIG. 2 is block diagram of an electronic circuit of a disk drive apparatus to which a BEMF calibration method is applied, according to an embodiment of the present general inventive concept.

First, a description will be given of an electrical system 40 controlling a disk drive apparatus according to an embodiment of the present general inventive concept. Referring to FIG. 2, the electrical system 40 includes a controller 42 coupled to a head 2 through a read/write (R/W) channel circuit 44 and a pre-amplifier 46, and a BEMF measurer 52 coupled to the controller 42 to measure BEMF generated from the coil 26 of the VCM.

The controller 42 may be a digital signal processor (DSP), a microprocessor, a microcontroller, etc. The controller 42 controls the R/W channel circuit 44 to read data from a disk 1 or write data on a disk 1.

The controller 42 is also coupled to a VCM driver unit, such as a VCM driver circuit 48, that supplies a driving current to the voice coil 26. The controller 42 supplies a control signal to the VCM driver circuit 48 that controls excitation of the voice coil and movement of a head 2. Also, the controller 42 controls the loading and unloading of the head 2, and especially the BEMF calibration process during unloading.

Firmware and various control data to control the disk drive apparatus are stored in the memory 50. Of course, the memory 50 also stores programs for the procedures illustrated in FIGS. 4 and 5.

A general description of the operation of a disk drive apparatus will now be given.

In a data read mode, the disk drive apparatus amplifies an electrical signal from the disk 1 detected through the head 2 by the pre-amplifier 46. Then, the R/W channel circuit 44 encodes the signal read from the disk 1 into a digital signal according to the timing of a read sector pulse generated by the controller 42, and converts the digital signals to stream data and sends it through the host interface circuit 54 to a host device (not illustrated).

In a data write mode, the disk drive apparatus receives data from the host device through the host interface circuit 54, and temporarily stores the data in an internal buffer (not illustrated) of the host interface circuit 54. Then, the data stored in the buffer is sequentially output and converted through the R/W channel circuit 44 to a binary data stream compatible with the write channels of the disk 1, and a current amplified through the pre-amplifier 46 writes the data through the head 2 on the disk 1 at a point when a write sector pulse is generated.

A description of the BEMF measurer 52 is as follows.

Figure 3:
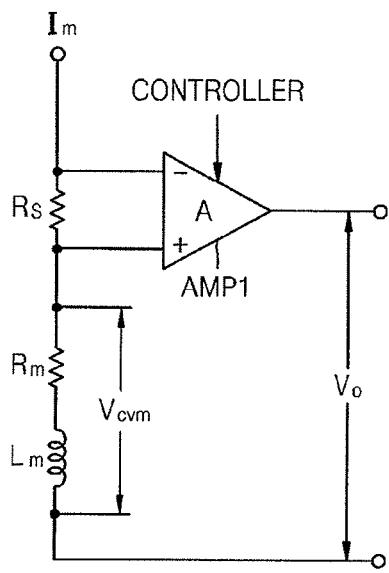
FIG. 3 is a detailed circuit diagram of the BEMF measurer in FIG. 2, an embodiment of the present general inventive concept.

FIG. 3 is a detailed circuit diagram of the BEMF measurer 52. $R_m$ is the coil resistance of the VCM, $L_m$ is the coil inductance of the VCM, and $R_s$ is a sensing resistance to measure the current $l_m$ flowing through the VCM. The amp AMP1 amplifies the voltage that is dropped at the sensing resistance $R_s$ through a variable gain (A).

The voltage $V_{cvm}$ at the VMC can be expressed by Equation 1 as follows.

$$V_{vcm} = L_m \times dl_m/dt + R_m \times l_m + V\_bemf \qquad \text{Equation 1}$$

Here, V_bemf is the voltage of the BEMF of the VCM.

Accordingly, the output voltage $V_o$ of the BEMF measurer 52 can be expressed by Equation 2 as follows.

$$V_o = (L_m \times dl_m/dt + R_m \times l_m + V\_bemf) - A \times R_s \times l_m \qquad \text{Equation 2}$$

Here, at the point where the BEMF is measured, if the current $l_m$ flowing through the VCM is assumed to be steady, Equation 2 may be expressed as Equation 3 as follows.

$$V_o = R_m \times l_m + V\_bemf - A \times R_s \times l_m = V\_bemf + (R_m/R_s - A) \times l_m \times R_s \qquad \text{Equation 3}$$

In Equation 3, assuming that $R_m/R_s - A = 0$, the output voltage $V_o$ of the BEMF measurer 52 becomes the BEMF V_bemf generated by the VCM.

Accordingly, because the value $R_s$ is already known, the value $R_m$ can be known, and by matching the gain A of the AMP1 to the value $R_m/R_s$, the BEMF value can be accurately measured.

If the gain A of the AMP1 does not match the value $R_m/R_s$, an error occurs in the BEMF value measured by the BEMF measurer 52.

However, as already described, the coil resistance $R_m$ of the VCM varies according to the temperature of the coil.

Figure 4:
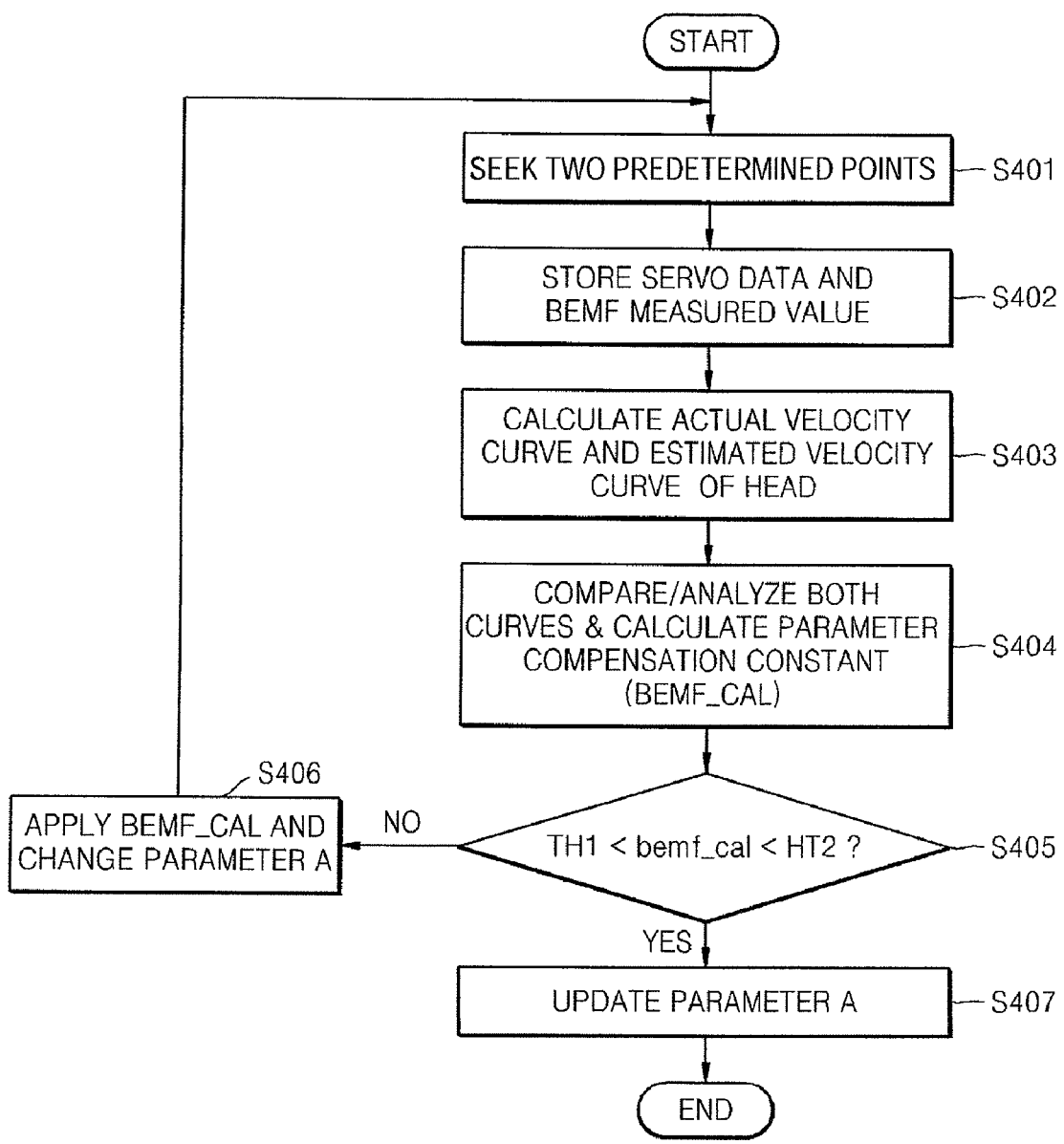
FIG. 4 is a flowchart of a BEMF calibration method according to an embodiment of the present general inventive concept.

Thus, in order to reduce the margin of error for the BEMF measurement prior to unloading, the controller 42 adjusts a BEMF measuring parameter A, as illustrated in the flowchart of FIG. 4.

Right before unloading, a seek operation is conducted for two arbitrary points on the disk in operation S401, for the BEMF calibration. In an embodiment of the present general inventive concept, a seek is conducted with a sine wave acceleration curve.

When the seek operation is performed, the servo data read from the disk and the analog voltage measured by the BEMF measurer 52 is converted to digital signals and stored in the memory 50 in operation S402. The servo data specifically signifies the track data.

Then, in sampling time intervals, the servo data is used to compute the actual velocity V_real (i) of the head and the estimated velocity V_bemf (i) of the head, and generate the curves of the actual velocity V_real (i) and the estimated velocity V_bemf (i) of the head in operation S403.

Specifically, track number data is stored in the servo data, so that the number of tracks moved by velocity measurement sections can be derived. Thus, the distance moved by velocity measurement sampling sections is calculated as (number of tracks moved)×(track pitch), and the actual velocity V_real (i) of the head can be calculated using Equation 4 below.

$$V\_real(i)=(N \times P)/T \qquad \text{Equation 4}$$

Here, N is the number of tracks moved within the velocity measurement sampling sections, P is the track pitch, and T is the time elapsed in the velocity measurement sections.

The predicted velocity V_bemf(i) of the head from the BEMF can be calculated as illustrated below.

The relationship between the BEMF of the VCM V_bemf and the acceleration ω of VCM may be expressed by Equation 5 as follows.

$$V\_bemf = Kb \times \omega \qquad \text{Equation 5}$$

Here, Kb is the BEMF constant.

Accordingly, the angular velocity of the VCM can be derived from the BEMF value measured at the point at which the estimated head velocity is to be derived. There is a proportional relationship between the angular velocity of the VCM and the moving velocity of the actuator, and a proportional constant (Kc) therebetween already exists.

Accordingly, when the proportional constant Kc is multiplied with the angular velocity of the VCM derived from the measured BEMF, an estimated head velocity V_bemf(i) can be ultimately calculated from the BEMF.

When the acceleration curve used in regard to seek controlling is a sine wave acceleration curve, a velocity curve or a sine wave is employed.

Next, the actual head velocity curve and the estimated head velocity curve will be analyzed to calculate a parameter compensation constant bemf_cal to compensate the BEMF parameter in operation S404. The parameter compensation constant bemf_cal may be calculated, for example, as a ratio of first harmonic elements of each curve.

A detailed explanation of the calculation method of the parameter compensation constant bemf_cal will be given.

First, the Discrete Fourier Transform (DFT) is applied to the actual velocity of the head V_real (i) in Equation 6 below to calculate a first harmonic sin coefficient V_real_sin_coef ($1^{st}$).

$$V\_real\_sin\_coef(1st) = \frac{2}{N}\sum_{i}^{N-1} V\_real(i) \cdot \sin(2\pi f_1 Ts \cdot i) \qquad \text{Equation 6}$$

wherein

Ts: sampling time, $f_1$: first harmonic frequency, and

N: number of V_real (i) sample calculated during a seek.

Similarly, the Discrete Fourier Transform (DFT) is applied to the estimated head velocity V_bemf(i) in Equation 7 below to calculate a first harmonic sin coefficient V_bemf_sin_coef ($1^{st}$).

$$V\_bemf\_sin\_coef(1st) = \frac{2}{N}\sum_{i}^{N-1} V\_bemf(i) \cdot \sin(2\pi f_1 Ts \cdot i) \qquad \text{Equation 7}$$

wherein

Ts: sampling time, $f_1$: first harmonic frequency, and

N: number of V_bemf(i) sample calculated during a seek.

Thereafter, Equation 8 below can be used to derive a the parameter compensation constant bemf_cal.

$$bemf\_cal = \frac{V\_bemf\_sin\_coef(1st)}{V\_real\_sin\_coef(1st)} \qquad \text{Equation 8}$$

Then, it is determined in operation S405 whether the parameter compensation constant bemf_cal value is within a critical range. That is, it is determined whether the parameter compensation constant bemf_cal is between a critical value TH1 and another critical value TH2. Here, the critical value TH1 is set between 0 and 1, and the critical value TH2 is set between 1 and 2. For example, TH1=0.9, and TH2=1.1. This signifies that there is up to a 10% margin error in velocity.

When the comparison results from operation S405 illustrate that the parameter compensation constant bemf_cal value is not with the critical range, the parameter compensation constant bemf_cal is used and the parameter A used to measure the BEMF is changed so that the margin error in velocity is reduced, and then operations S401 through S406 are repeated.

That is, if the parameter compensation constant bemf_cal is greater than 1, it can be determined through Equations 8 and 5 that the value measured by the BEMF measurer 52 is greater than the actual BEMF value. Referring to Equation 3, $R_m/R_s > A$. Thus, to reduce the margin error in velocity, the magnitude of the gain (A) of the AMP1 must be increased.

Therefore, in an embodiment of the present general inventive concept, the bemf_cal value is multiplied with the gain (A) value of the AMP1 to change the magnitude of the gain (A) to reduce the margin of error for velocity.

Also, when the parameter compensation constant bemf_cal is less than 1, it can be determined through Equations 8 and 5 that the value measured by the BEMF measurer 52 is less than the actual BEMF value. Referring to Equation 3, $R_m/R_s < A$. Thus, the gain (A) of the AMP1 must be decreased to reduce the margin of error for velocity.

Therefore, in another embodiment of the present general inventive concept, the bemf_cal value is multiplied with the gain (A) value of the AMP1 to change the magnitude of the gain (A) to reduce the margin of error for velocity.

Depending on the circumstances, the gain (A) magnitude of the AMP1 can be made to vary in predetermined increments.

When the compared results from operation S405 illustrate that the parameter compensation constant bemf_cal is within a critical range, the ratio of the actual velocity of the head to the estimated velocity of the head is within an allowable range, so that the current parameter (A) value is updated in operation S407.

Figure 5:
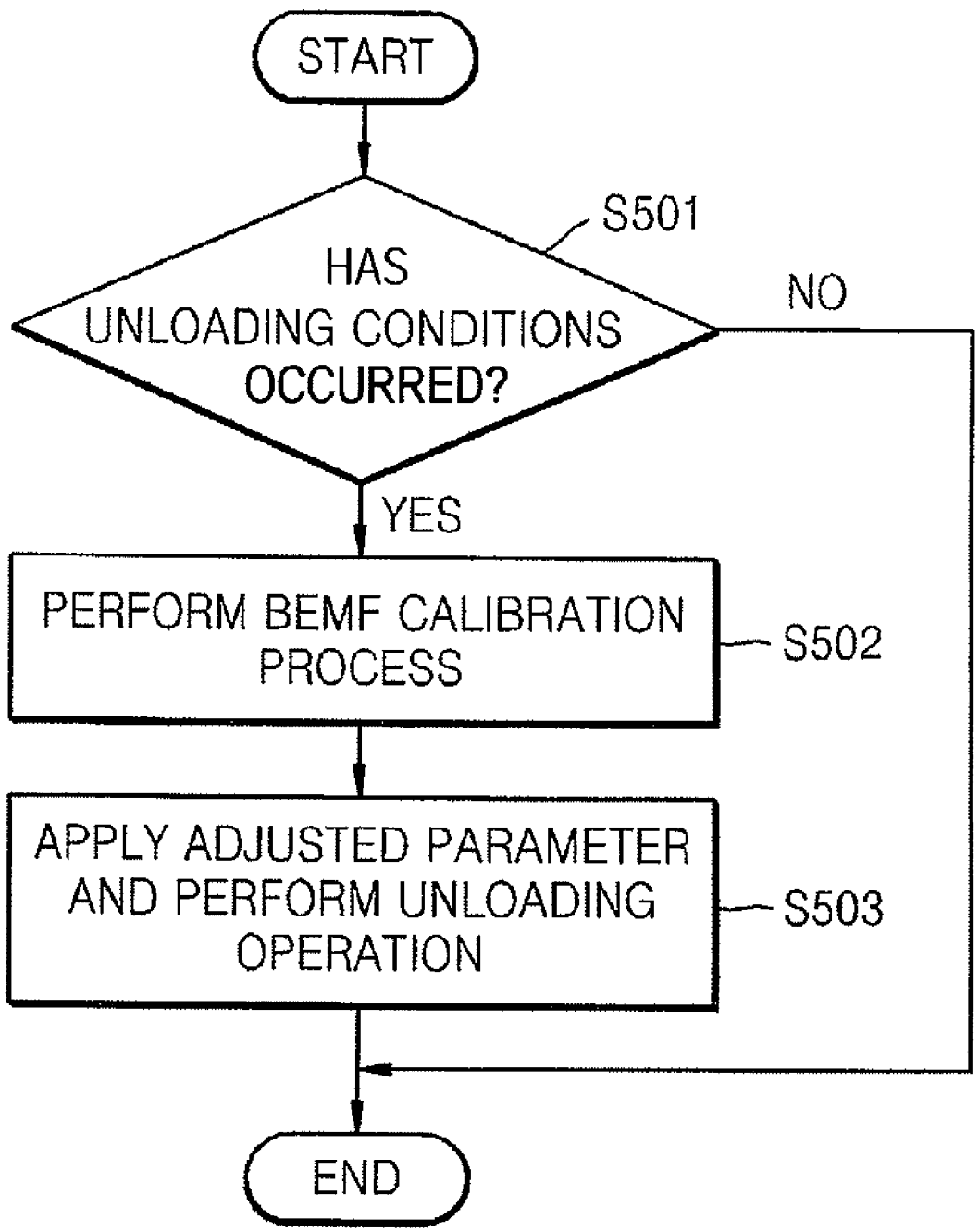
FIG. 5 is a flowchart of a controlling method to unload according to an embodiment of the present general inventive.

Next, an unloading controlling method in a disk drive apparatus according to the present general inventive concept will be described, with reference to FIG. 5.

First, the controller 42 determines in operation S501 whether an unloading operation should be performed. Conditions to unload include where power is switched OFF or a parking command is input while the head is in a loaded position.

When it is determined in operation S501 that the unloading operation should be performed, the controller 42 suspends the performing of the unloading operation and performs the BEMF calibration process in operation S502. Since the BEMF calibration process has already been described with reference to FIG. 4, it will not be repeated.

After performing the BEMF calibration process and applying the adjusted parameters, the velocity of the VCM is measured through the BEMF, and the unloading operation is performed at a controlled, desired velocity curve in operation S503.

Figure 6:
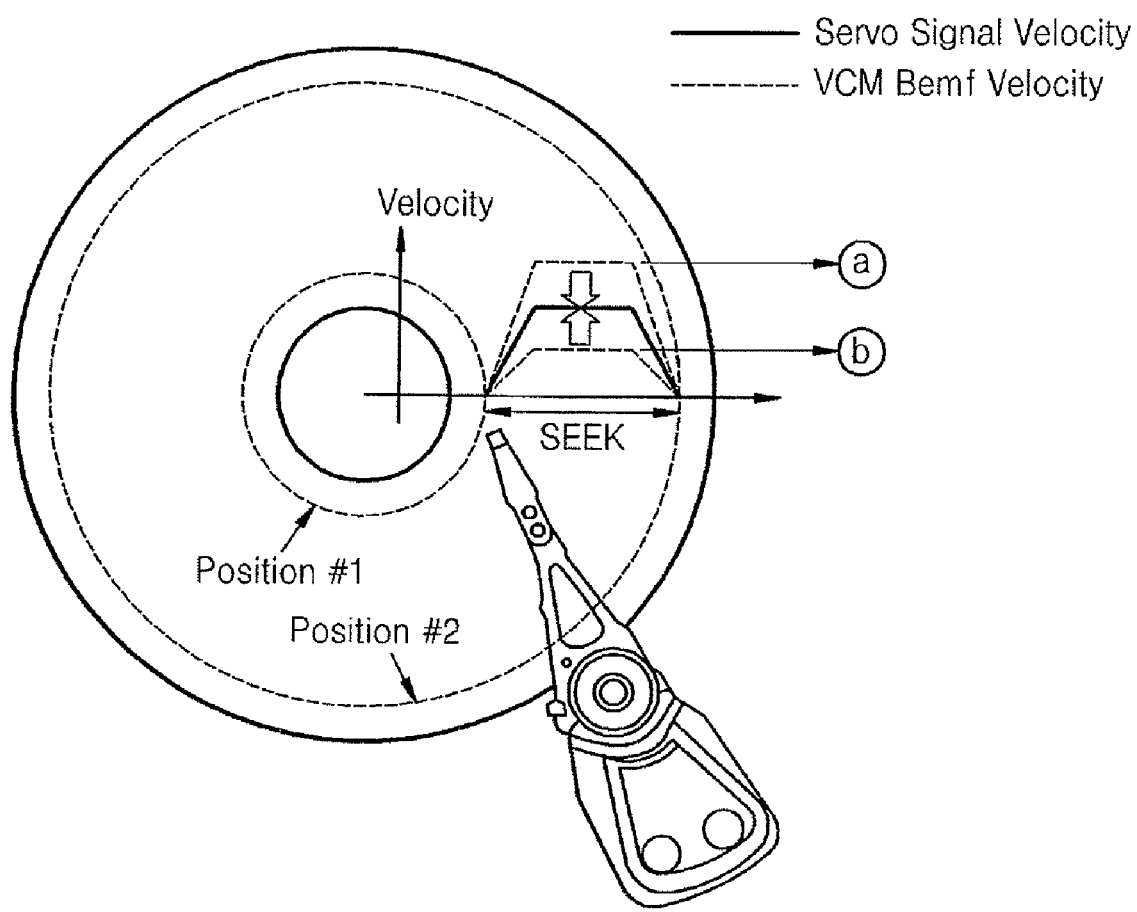
FIG. 6 is a plan view of a disk drive apparatus illustrating a difference between an actual velocity of head during a seek before a BEMF calibration is performed and an estimated head velocity based on the BEMF calibration according to an embodiment of the present general inventive concept.

For reference, as illustrated in FIG. 6, during a seek operation before the BEMF calibration, there can be a difference in the actual velocity of the head based on the servo signal and the estimated velocity of the head using the BEMF. That is, referring to FIG. 6, in case ⓐ the velocity of the head that is estimated from the BEMF is greater than the actual velocity of the head, and in case ⓑ the velocity of the head that is calculated from the BEMF is less than the actual velocity of the head.

Figure 7A:
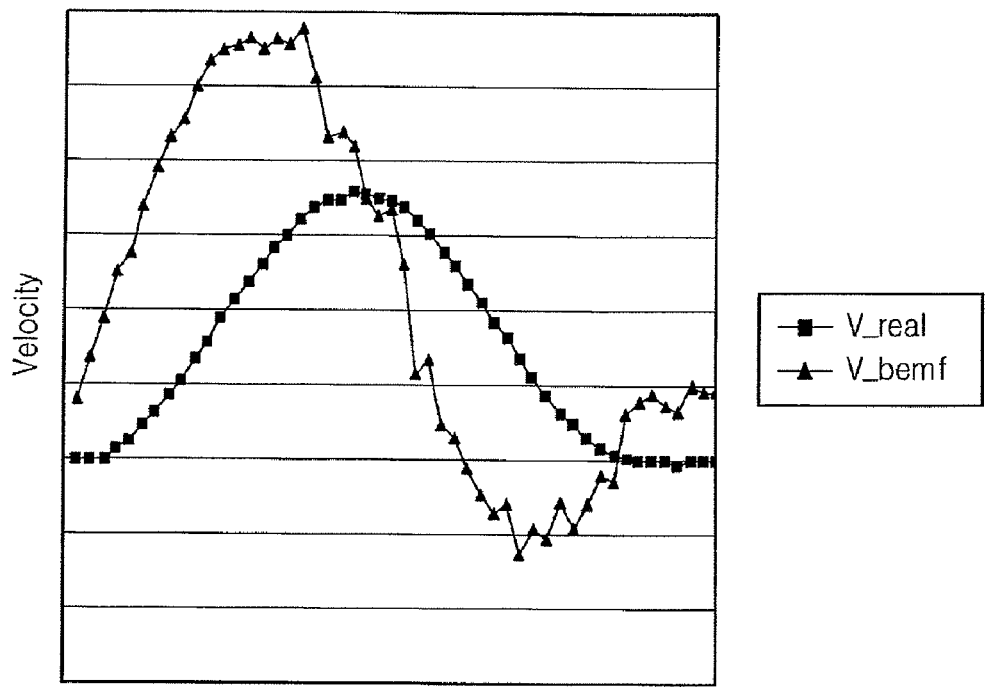
FIG. 7A is a graph to compare an actual velocity curve of a head during a seek without performing a BEMF calibration, and a velocity curve of the head calculated from a BEMF calibration according to an embodiment of the present general inventive concept.

FIG. 7A illustrates the actual velocity curve of the head and the velocity curve of the head calculated from the BEMF, when a seek operation is performed without a BEMF calibration process performed.

Figure 7B:
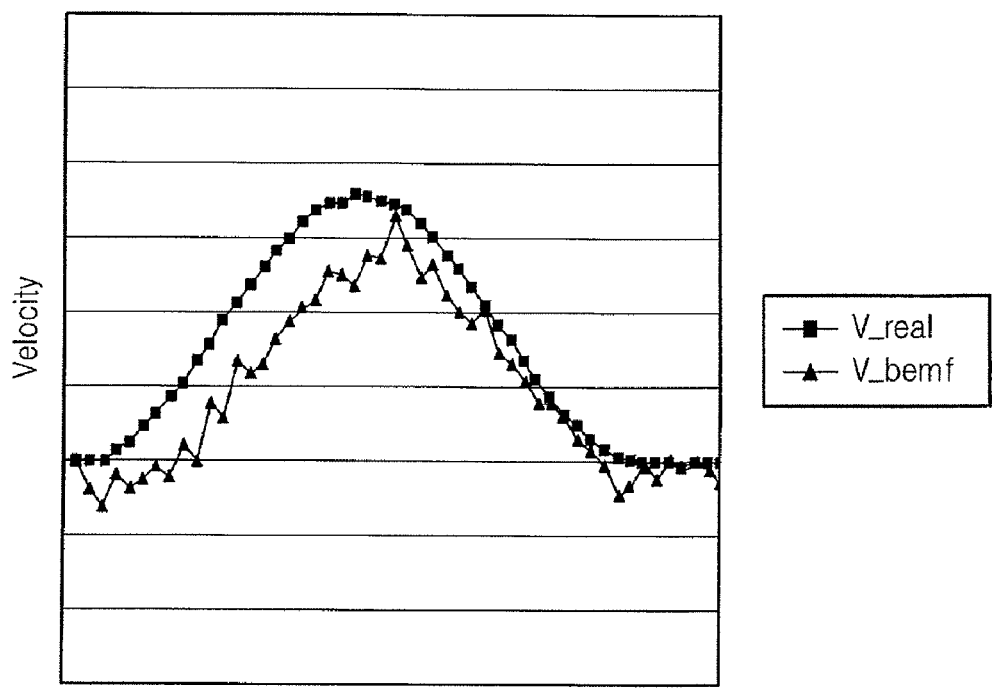
FIG. 7B is a graph to compare an actual velocity curve of a head after a BEMF calibration according to the present general inventive concept has been performed, and an estimated velocity curve of the head based on the BEMF calibration according to an embodiment of the present general inventive concept.

Alternatively, FIG. 7B, illustrates the actual velocity curve of the head and the velocity curve of the head calculated from the BEMF, when a seek operation is performed after a BEMF calibration process is performed.

Accordingly, when comparing FIGS. 7B and 7A, it is apparent that the difference between the actual velocity curve of the head and the velocity curve of the head calculated from the BEMF can be substantially reduced.

As described, in various embodiments of the present general inventive concept, a predetermined seek operation is performed prior to an unloading operation, and a BEMF calibration is performed to minimize the difference between the actual velocity curve of the head and the velocity curve of the head calculated from the BEMF, by accurately calculating the velocity of the head. Also, after performing a precise BEMF calibration before the unloading operation, the unloading operation can be performed with a precisely controlled unloading velocity due to the accuracy of the head velocity calculated with the BEMF.

The present general inventive concept may be applied to methods, apparatuses, systems, etc. The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include semiconductor memory devices, read only memory (ROM) random access memory (RAM), CD-ROMS, magnetic tapes, flash memory, erasable ROM (EROM), floppy disks, optical data storage devices, hard disks, fiber optic media, wireless radio frequency (RF) networks, etc. The computer transmission medium can transmit carrier waves or signals (e.g., wired or wireless data transmission through the Internet, electronic network channels, fiber optics, air, electromagnetic fields, RF networks, etc). Also, functional programs, codes, segments to accomplish the present general inventive concept can be easily construed by programmers skilled in the art to which the present pertains.

Although a few embodiments of the present general inventive concept have been illustrated and described, it will be appreciated by those skilled in the art that changes may be made in these embodiments without departing from the principles and spirit of the general inventive concept, the scope of which is defined in the appended claims and their equivalents.

What is claimed is:

1. A method of calibrating a BEMF (back electromotive force), the method comprising:
   reading servo data and measuring a BEMF value while seeking two predetermined points on a disk, and storing the servo data and the BEMF value;
   generating an actual velocity curve of a head using the stored servo data, and an estimated velocity curve of the head using the stored BEMF value; and
   adjusting a parameter related to a BEMF measurement to align the actual velocity curve of the head with the estimated velocity curve of the head.

2. The method of claim 1, wherein the generating of the actual velocity curve of the head uses a servo signal as a sampling interval to divide an obtained seek distance into seek time intervals, and is generated from calculated actual velocity values of the head.

3. The method of claim 1, wherein the estimated velocity of the head is generated from an estimated velocity value of the head calculated by dividing a BEMF value measured in a VCM (voice coil motor) over a sampling interval by a BEMF constant to derive an estimated angular velocity value, and multiplying the estimated angular velocity value by a transforming proportional constant.

4. The method of claim 1, wherein the parameter corresponds to a changing rate of a coil resistance value of a voice coil motor, and is varied to align the actual velocity curve of the head with the estimated velocity curve of the head.

5. The method of claim 1, wherein the adjusting of the parameter includes calculating a ratio of the actual velocity curve of the head to the estimated velocity curve of the head, and adjusting a parameter related to the BEMF measurement to make the ratio approach 1.

6. The method of claim 5, wherein the ratio of the actual velocity curve of the head to the estimated velocity curve of the head is calculated as a ratio of a first harmonic sine coefficient of the actual velocity of the head to a first harmonic sine coefficient of the estimated velocity of the head.

7. A computer-readable recording medium having recorded thereon a computer program code to perform a method of calibrating a back electromotive force (BEMF), the method comprising:
   seeking two predetermined points on a disk to read servo data and measure a BEMF value, and store the servo data and the BEMF value;
   generating an actual velocity curve of a head using the stored servo data and an estimated velocity curve of the head using the stored BEMF value; and
   adjusting a parameter related to a BEMF measurement to align the actual velocity curve of the head with the estimated velocity curve of the head.

* * * * *